(12) United States Patent
Garfinkel

(10) Patent No.: US 10,484,535 B2
(45) Date of Patent: Nov. 19, 2019

(54) METHOD AND SYSTEM FOR TEXT ENABLEMENT OF LANDLINE TELEPHONE NUMBER WITH THREAD AND GROUP CHAT ENABLEMENT

(71) Applicant: Dean Garfinkel, Aurora, NE (US)

(72) Inventor: Dean Garfinkel, Aurora, NE (US)

( * ) Notice: Subject to any disclaimer, the term of this patent is extended or adjusted under 35 U.S.C. 154(b) by 0 days.

(21) Appl. No.: 16/103,000

(22) Filed: Aug. 14, 2018

(65) Prior Publication Data
US 2018/0359359 A1    Dec. 13, 2018

Related U.S. Application Data

(63) Continuation-in-part of application No. 15/956,382, filed on Apr. 18, 2018.

(60) Provisional application No. 62/545,186, filed on Aug. 14, 2017, provisional application No. 62/486,734, filed on Apr. 18, 2017.

(51) Int. Cl.
*H04M 3/42* (2006.01)
*H04W 4/14* (2009.01)
*H04L 12/58* (2006.01)

(52) U.S. Cl.
CPC ........ *H04M 3/42382* (2013.01); *H04L 51/38* (2013.01); *H04W 4/14* (2013.01); *H04L 51/14* (2013.01)

(58) Field of Classification Search
CPC .......... H04M 3/42382; H04M 1/2473; H04M 1/72552; H04M 1/2478; H04W 4/14; H04L 51/14; H04L 51/38; H04L 51/066
See application file for complete search history.

(56) References Cited

U.S. PATENT DOCUMENTS

| | | | |
|---|---|---|---|
| 2002/0082030 A1* | 6/2002 | Berndt | H04M 3/42229 455/466 |
| 2010/0124318 A1* | 5/2010 | Cai | H04M 3/42382 379/93.24 |
| 2013/0172026 A1* | 7/2013 | Odell | H04L 51/046 455/466 |
| 2015/0186354 A1* | 7/2015 | Kim | G06F 17/27 704/9 |
| 2018/0159812 A1* | 6/2018 | Sarafa | H04L 51/16 |

* cited by examiner

*Primary Examiner* — Marcos L Torres
(74) *Attorney, Agent, or Firm* — Barnes & Thornburg LLP

(57) ABSTRACT

A method and system receive and forward a text message received at a landline phone number to a user associated with that landline phone number, wherein the receipt and forwarding includes forwarding the text message to a computer and/or mobile device associated with the user, wherein the text message is forwarded automatically in response to receipt of the text message at the landline phone number, receiving a response to the forwarded text message, wherein the response is formulated by the user on the computer or the mobile device and sent from the computer or the mobile device, and forwarding the received response as a text message to a phone number that sent the text message to the landline phone number, wherein the forwarded response text message indicates the landline phone number as a number sending the response text message.

26 Claims, No Drawings

METHOD AND SYSTEM FOR TEXT ENABLEMENT OF LANDLINE TELEPHONE NUMBER WITH THREAD AND GROUP CHAT ENABLEMENT

CROSS-REFERENCE TO RELATED APPLICATION(S)

This application is a Continuation-in-Part of U.S. patent application Ser. No. 15/956,382 entitled "Method and System for Text Enablement of Landline Telephone Number," filed on Apr. 18, 2018 and relies for priority on U.S. Provisional Patent Application Ser. No. 62/545,186, entitled "Further Method and System for Text Enablement of Landline Telephone Number," filed on Aug. 14, 2017, the entirety of both applications being incorporated by reference herein.

FIELD

Disclosed embodiments relate in general to communication text messaging. In particular, disclosed embodiments relate to supporting or implementing text messaging functionality on a landline phone not configured to receive or send text messages.

BACKGROUND

A "landline" telephone (also known as land line, landline, main line, home phone, landline, fixed-line, and wireline) refers to a phone that uses a metal wire or fibre optic telephone line for transmission as distinguished from a mobile cellular line, which uses radio waves for transmission. The introduction, use, and wide adoption of mobile phones and the associated functionality supported by such mobile phones has, to some extent or another, rendered the use of landline phones less useful for communication between individuals and organizations. This is in part due to the stationary nature of landlines resulting in the requirement that a user must be physically proximate at a premises associated with the landline in order to receive a voice call there. This is also, in part, due to the increased functionality for communication that is conventionally available on mobile devices, for example, the ability to receive electronic mail (or e-mail, email) and/or text messages such as messages sent and received using Short Messaging Service (SMS) protocol and MMS (Multimedia Messaging Service), etc.

SUMMARY

In accordance with the disclosed embodiments, landline texting is implemented so as to enable a mobile user to send a text to a landline number. In this way, a user may send a text to a landline number in the same way that he sends a text to a mobile phone. Subsequently, the text is sent to the recipient associated with the landline number via their computer or mobile device via email without any new equipment installation required at the landline phone, computer or mobile device and without any need to access a web-based service or site to do so.

In accordance with the disclosed embodiments, an email reply to the email delivered text message may be sent from the user's computer or mobile device and will arrive at the initial text message sender's device like a convention text message reply and indicating that the reply message was sent from the user's landline phone.

DETAILED DESCRIPTION

Conventionally, landline phones are incapable of registering receipt of a text message. This is a problem for landlines of all types whether they are implemented using Voice Over Internet Protocol (VOIP) or via Public Switch Telephone Network (PSTN). Indeed, conventionally, landline phones are capable of receiving text messages; however, there is no mechanism that enables output such messages to a user.

Recently, technology has become commercially available for receiving and sending text messages in association with a landline. However, such technologies are implemented using software applications that utilize server based functionality that requires access to a web-based service that offers access to texts via a web-site on the Internet or computer software running on a user's computer or smart phone.

To the contrary, the presently disclosed embodiments provide text enabling of a landline telephone number allowing the user to send and receive text messages from their email. Thus, the presently disclosed embodiments are not merely a service for sending "mass" text messages. Rather, the disclosed embodiments enable true "one to one" text conversations.

Accordingly, disclosed embodiments enable any landline telephone number including a main business number or an employee's direct numbers (DIDs) to send and receive text messages.

In accordance with at least one embodiment, the text enabling service works seamlessly with any existing telephone system and carrier and requires no changes to be made to the telephone system or telephone carrier equipment, functionality or services. As a result, in accordance with at least one embodiment, a telephone number can be text enabled and text messages may be sent or received in less than 30 minutes right from an existing email account. The service enables the ability to send and receive text messages using the user's own email account, thereby eliminating the need to access or install any software.

In accordance with at least one embodiment, the text messaging enablement begins by generating and transmitting an electronic request to a user's telephone carrier from one of multiple telecommunication carriers through which the messaging ecosystem is provided (e.g., Netnumber, which administers an SMS directory or telephone numbers and which carriers manage those numbers) to enable text on a landline telephone number by assigning the requesting carrier's Service Profile Identifier (SPID) to that landline number.

The SPID is a number assigned by a phone company or other telecommunication carrier to a terminal on an Integrated Services Digital Network B-channel and is used to indicate the capabilities of each terminal (computer or phone) on the B-channels. For example, a basic rate home or business user may divide service into two B-channels with one used for normal phone service and the other for computer data. The SPID indicates whether the terminal accepts voice and/or data information.

Once the SPID is set, any text messages sent to this number are routed to that requesting carrier's SMS gateway. Subsequently, a software application running on one or more servers within a communication network included in or coupled to the telecommunications network, e.g., in the cloud, is used to store the user's mapping and reference information. As a result, every text enabled landline number is paired with a unique email address (i.e., the user's email address) within that software application. That software application is coupled to the SMS gateway, which enables the ability to send and receive SMS text messages to/from the messaging ecosystem.

In operation, when the application receives an SMS text message from the telecommunication network(s) that make up the messaging ecosystem, the software application analyzes the meta data for the text message, confirms that the text message is being sent to a landline number listed in a database of text enabled numbers, converts the text message to email and sends the message to the associated (paired) email address stored in the database via the SMTP relay. Subsequently, text messages may be sent from users' email.

Of particular utility is the present disclosed embodiments' ability to enable users to simply and seamlessly send an email, which is automatically converted into an SMS text message and then delivered to the text message recipient via the SMS gateway.

Further, a user may send the message to the intended recipient's telephone number@emailaddress.com. Example 15166565111@textbetter.com. In this case, the text message would be sent by the software application to the telephone number 15166565111.

In accordance with at least some disclosed embodiments, the system and methodologies for text message enablement may support multiple email domains allowing for customer specific branded email address when sending text from email.

In accordance with at least one disclosed embodiment, when sending a text message, the disclosed system and methodologies may utilize the application database to help determine the end of the text message to avoid sending of a signature block. For example, optionally, analysis is performed to identify the sender's first name which is stored in the database. Additionally, optionally, analysis may be performed to identify closing or salutation language, including, for example, Best Wishes, Kind Regards, With anticipation, Kind thoughts, All the best, Write soon, With many thanks, Stay tuned, Adieu, Respectfully yours, Cheers, Warm Regards, Sincerely, Thank you, Regards, Chow, Thanks, Best.

In accordance with at least one embodiment, as part of the conversion of a text message to email, the system "threads" the text conversation in the email. That is, multiple text messages are included in the email, thereby including the conversation contents in a single email for reference by a member of the text message conversation. Note, in implementation, this may include two members of the conversation wherein those two members are communicating directly and without the involvement of other participants. Alternatively, this may include converted text messages from more than two participants, e.g., in which three or more users are participating in what is conventionally referred to as a "group chat."

It should be understood that such threading is not possible using SMS and associated protocols because those protocols do not include reference to a message to which a response is made. Therefore, it is not possible to thread together a series of text messages using the SMS protocol to determine what replies correspond to what inquiries without additional technology for doing so.

Associated utility is provided by such embodiments because they enable the ability for conversation participants to refer to query-response back and forth details in a single email. Moreover, such threaded conversation content may be particularly useful for documenting text message back and forth associated with delivery of services and/or products, for example, a handy man coming to work on a person's house, a house cleaner coming to clean an apartment, etc. For example, having text messages in an email may further facilitate the ability to analyze conversation content to generate an invoice, document a service call or otherwise perform text data analysis using software for automating such processes.

Disclosed embodiments can thread such text messages because the text messages are temporarily stored for a reasonable period of time, as part of the text message conversion process. Thus, the text messages may be stored for various different periods of time depending on the value of such storage, e.g., a day, a week, a month, etc. This variation is storage periods may be based on the value of the message text to the conversation participants, e.g., a small business using the embodiments to schedule installation of a garage door may wish to have the messages with its customers stored for two weeks, which may be the likely maximum period of time necessary to schedule and complete an installation appointment.

Additionally, disclosed embodiments may also enable the ability to also include an indicator whether and/or when a message was sent, received or read within the thread.

Furthermore, text messages may be archived and searchable as a result of converting the messages and message conversations to e-mail and storing those email messages.

In accordance with at least one disclosed embodiment, the system and methodologies may use software operations that split up the "sent" email message into separate 160 character messages for transmission via text message, wherein the separated portions are sent in order.

In accordance with at least some embodiments, messages status information may be archived and/or available to users for reference. Additionally, all text messages may be archived with email in the same .pst file.

As a result, in operation a user may have a user experience that enables simple operation to receive and/or send text messages in association with their landline phone number via email. Thus, the disclosed embodiments enable a user to send and receive text messages via email as follows.

To send a text message, a user simply composes a new email including, in the "To" line, the mobile telephone number to which they want to send a text (11 digit format) @textbetter.com, for example, if they wanted to send a text message to 15166565111: your "to" line would be 15166565111@textbetter.com. Then, in the body of their email, starting at the top left, they would type the message that they want to send. Note, only the first 306 characters will be sent; additionally, in accordance with at least one embodiment, the subject line will not be included in the sent message.

Subsequently, the user pressing the "send" button, trigger automatic conversion of the email content into text message format for transmission via text message. Note, in accordance with at least one embodiment, the signature block may be excluded in the text message, if it contains a salutation* like "Thank you" or "Regards". Additionally, a user can use the "]" symbol to indicate the end of the message to send.

Likewise, when receiving a text message, someone sends the user a text message to their "text enabled telephone number", triggering conversion of the text message into email format and transmission to the user's email address. As a result, an email message will appear in their inbox that may have a subject line similar to: ☎ TEXT Message From 15166565111. To reply to that text message, the user simply chooses "reply" and type their message and presses "send."

Disclosed embodiments may be utilized in a variety of ways including text enabling a company's direct numbers (DID's) so that each employee will be able to send and receive text messages directly from their email. As a result of such an implementation, all text conversations may be archived by the company's email system—just like any other email.

Furthermore, additional utility may be provided by text enabling a company's the main number of a business. This may enable, for example, dispatchers to communicate with the fleet or for offices to confirm appointments with customers. Likewise, a dispatcher at a main office can quickly and easily send text messages to technicians in the field about changes to their schedule or for the technician to report when an appointment is completed. Again, all text conversations may be archived by the company's email system—just like any other email.

Moreover, particular utility may be provided for medical offices/dental practices by enabling users remind patients by text rather than making voice calls. Thus, when the patients reply to the text, the practice is able to see the response in their email, know which patients confirmed and have record of that confirmation.

It should be appreciated that software and functionality described above may be implemented via software, firmware and/or hardware. Additionally, that functionality may be delivered one or more communication networks that may include any type of Communications network including but not limited to a second Generation (2G) network, a 2.5 Generation network, a third Generation (3G) network utilizing GSM, Wideband Code Division Multiplex Access (WCDMA), CDMA, or Time Division Multiplex Access (TDMA), GPRS, Universal Mobile Telephone System (UMTS), etc. Network(s) can also be implemented as a combination of two or more technologies i.e., a hybrid network. Further, communication network(s) may also include generic Internet access using one or more transport methods. Further, the one or more communication networks may also include Local Area Networks (LANs), such as Wireless Local Area Networks (WLAN), BlueTooth (BT) and optionally utilize one or more other technologies, such as WiMax (WorldwideInteroperability for Microwave Access). Communication via the one or more communication networks may be implemented by broadcasting over cellular, broadcasting over DVB-H (Digital Video Broadcasting-Handhelds), ISDB-T (Terrestrial Integrated Services Digital Broadcasting) or DMB (Digital Multimedia Broadcasting).

Gateways may be configured to provide two way communications between the Internet and communication network(s) and may be embodied as a proxy server or firewall server, router and/or switch (not shown). More specifically, a gateway unit may be implemented to enable implementation of Internet-based VoIP services within the cellular infrastructure provided within communication network(s).

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

Additionally, it should be understood that the functionality described in connection with various described components of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

It is to be understood that other embodiments may be utilized and structural and functional modifications may be made without departing from the scope and spirit of the present invention.

Moreover, it should be understood that various connections are set forth between elements in the above description; however, these connections in general, and, unless otherwise specified, may be either direct or indirect, either permanent or transitory, and either dedicated or shared, and that this specification is not intended to be limiting in this respect.

We claim:

1. A system for converting a telephone number not provisioned for receipt and output of Short Messaging Service (SMS) text messages into an SMS-to-electronic mail conversion enabled telephone number, wherein the system is configured to:

assign a carrier's Service Profile IDentifier (SPID) to the telephone number not provisioned for receipt and output of SMS text messages;

receive an SMS text message from an SMS text message sender, wherein the SMS text message is addressed to be received at the telephone number not provisioned for receipt and output of SMS text messages and the SMS text message is routed to the carrier's SMS gateway based on the carrier's assigned SPID;

include content of the SMS text message in an electronic mail message to a user associated with that telephone number not provisioned for receipt and output of SMS text messages, and sending the electronic mail message to the user at a computer and/or mobile device associated with the user, wherein the content of the SMS text message is included in the electronic mail message sent to the user automatically in response to receiving the SMS text message addressed to the telephone number not provisioned for receipt and output of SMS text messages;

receive a user's electronic mail message response to the electronic mail message including content of the SMS text message, wherein content of the electronic mail message response is formulated by the user on the computer or the mobile device and sent from the computer or the mobile device; and include the content of the electronic mail message response in a response SMS text message sent to a telephone number of the SMS text message sender, wherein the response SMS text message indicates the telephone number not provisioned for receipt and output of SMS text messages as the telephone number sending the response SMS text message, and wherein the content of the SMS text message, the content of the response SMS text message and any subsequent SMS text messages and response SMS text messages sent between the SMS text message sender and the user are combined in an electronic mail message sent to the user's computer device or mobile phone, whereby the user is made aware of SMS text messages erroneously sent to their telephone number that is not provisioned for receipt and output of SMS text messages.

2. The system of claim 1, wherein the SMS text message is sent to the user and at least one additional recipient in a group.

3. The system of claim 1, wherein the content of the SMS text messages are combined in the electronic mail message are threaded so as to be read as a conversation between the text message sender and the user.

4. The system of claim 3, wherein the SMS text message is addressed to be sent to the user at the telephone number not provisioned for receipt and output of SMS text messages and at least one additional recipient in a group.

5. The system of claim 4, wherein SMS text messages and response SMS text messages from participants in the group are differentiated from each other in the electronic mail message for reference by the participants in the conversation.

6. The system of claim 5, wherein the SMS text message is part of a group chat in which the participants in the group are communicating.

7. The system of claim 1, wherein content of electronic mail messages sent is analyzed to generate an invoice, document a service call or otherwise perform text data analysis using automated software.

8. The system of claim 1, wherein content of electronic mail messages are stored for a period of time following the SMS text message-electronic mail message conversation.

9. The system of claim 8, wherein the period of time is a day, a week, a month or a year.

10. The system of claim 1, wherein content of the electronic mail message includes an indicator whether a related SMS text message was sent or received.

11. The system of claim 1, wherein content of the electronic mail message includes an indicator when a related SMS text message was sent or received.

12. The system of claim 1, wherein the system generates an electronic mail message that includes content of previous SMS text messages and SMS text response messages in response to another SMS text message being sent from the SMS text message sender addressed to the user's telephone number not provisioned to receive and output SMS text messages.

13. The system of claim 1, wherein content of electronic mail messages exchanged with the user is stored and searchable via software.

14. A method for converting a telephone number not provisioned for receipt and output of Short Messaging Service (SMS) text messages into an SMS-to-electronic mail conversion enabled telephone number, the method comprising:

assigning a carrier's Service Profile IDentifier (SPID) to the telephone number not provisioned for receipt and output of SMS text messages;

receiving an SMS text message from an SMS text message sender, wherein the SMS text message is addressed to be received at the telephone number not provisioned for receipt and output of SMS text messages and the SMS text message is routed to the carrier's SMS gateway based on the carrier's assigned SPID;

including content of the SMS text message in an electronic mail message to a user associated with that telephone number not provisioned for receipt and output of SMS text messages, and sending the electronic mail message to the user at a computer and/or mobile device associated with the user, wherein the content of the SMS text message is included in the electronic mail message sent to the user automatically in response to receiving the SMS text message addressed to the telephone number not provisioned for receipt and output of SMS text messages;

receiving a user's electronic mail message response to the electronic mail message including content of the SMS text message, wherein content of the electronic mail message response is formulated by the user on the computer or the mobile device and sent from the computer or the mobile device; and including the content of the electronic mail message response in a response SMS text message sent to a telephone number of the SMS text message sender, wherein the response SMS text message indicates the telephone number not provisioned for receipt and output of SMS text messages as the telephone number sending the response SMS text message, and wherein the content of the SMS text message, the content of the response SMS text message and any subsequent SMS text messages and response SMS text messages sent between the SMS text message sender and the user are combined in an electronic mail message sent to the user's computer device or mobile phone, whereby the user is made aware of SMS text messages erroneously sent to their telephone number that is not provisioned for receipt and output of SMS text messages.

15. The method of claim 14, wherein the SMS text message is sent to the user and at least one additional recipient in a group.

16. The method of claim 14, wherein the content of the SMS text messages are combined in the electronic mail message are threaded so as to be read as a conversation between the text message sender and the user.

17. The method of claim 16, wherein the SMS text message is addressed to be sent to the user at the telephone number not provisioned for receipt and output of SMS text messages and at least one additional recipient in a group.

18. The method of claim 17, wherein SMS text messages and response SMS text messages from participants in the group are differentiated from each other in the electronic mail message for reference by the participants in the conversation.

19. The method of claim 18, wherein the SMS text message is part of a group chat in which the participants in the group are communicating.

20. The method of claim 14, wherein content of electronic mail messages sent is analyzed to generate an invoice, document a service call or otherwise perform text data analysis using automated software.

21. The method of claim 14, wherein content of electronic mail messages are stored for a period of time following the SMS text message-electronic mail message conversation.

22. The method of claim 21, wherein the period of time is a day, a week, a month or a year.

23. The method of claim 14, wherein content of the electronic mail message includes an indicator whether a related SMS text message was sent or received.

24. The method of claim 14, wherein content of the electronic mail message includes an indicator when a related SMS text message was sent or received.

25. The method of claim 14, wherein the system generates an electronic mail message that includes content of previous SMS text messages and SMS text response messages in response to another SMS text message being sent from the SMS text message sender addressed to the user's telephone number not provisioned to receive and output SMS text messages.

26. The method of claim 14, wherein content of electronic mail messages exchanged with the user is stored and searchable via software.

\* \* \* \* \*